United States Patent
Allen (10) Patent No.: US 6,366,292 B1
(45) Date of Patent: Apr. 2, 2002

(54) SCALING METHOD AND APPARATUS FOR A FLAT PANEL DISPLAY

(75) Inventor: Daniel J. Allen, Derry, NH (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/338,011

(22) Filed: Jun. 22, 1999

(51) Int. Cl.$^7$ ................................................. G09G 5/36
(52) U.S. Cl. .......................... 345/611; 345/87; 382/266
(58) Field of Search ................................. 345/606, 611, 345/612, 613, 614, 615, 616, 87, 88, 89; 382/266, 267, 268, 269

(56) References Cited

U.S. PATENT DOCUMENTS

| | | | |
|---|---|---|---|
| 5,054,100 A | 10/1991 | Tai | 382/47 |
| 5,131,057 A | 7/1992 | Walowit et al. | 382/41 |
| 5,446,804 A | 8/1995 | Allebach et al. | 382/298 |

OTHER PUBLICATIONS

Biancardi, A. et al. "Improvements to Image Magnification," 9$^{th}$International Conference on Image Analysis and Processing, Florence, Italy, Sep. 17–19, 1997, pp. 142–149.

Allebach, J et al. "Edge–Directed Interpolation," Proceedings of the International Conference on Image Processing (ICIP), New York, Sep. 16, 1996, pp.707–710.

Primary Examiner—Xiao Wu
(74) Attorney, Agent, or Firm—Testa, Hurwitz & Thibeault, LLP (57) ABSTRACT

A method and apparatus for the scaling of digital image data for improved image quality on LCD displays is described. An output pixel value is determined from a source pixel array approximately centered at the output pixel location. Edge arrays are generated by comparing the differences in the color component values of adjacent vertical and horizontal pixels to a threshold value. Logic arrays operate on edge arrays to determine if the source pixel array matches predetermined pixel arrangements. Offset values corresponding to the location of the output pixel relative to the center pixel in the source pixel array are calculated. The offset values are modified if a logic array match is found. Offset values are also modified according to a predetermined modifier function. Bilinear interpolation based on the resulting offset values is used to determine the output pixel value.

29 Claims, 11 Drawing Sheets

SOURCE DATA AFTER 1.6 SCALING USING PIXEL REPLICATION

FIG. 1A

SOURCE DATA AFTER 1.6 SCALING USING BI-LINEAR INTERPOLATION IN X AND Y

FIG. 1B

SOURCE DATA AFTER 1.6 SCALING USING NON-LINEAR INTERPOLATION AND PATTERN MATCHING MODIFICATION

FIG. 1C

FIG. 2C  1.6 x SCALING USING NON-LINEAR INTERPOLATION AND PATTERN MODIFICATION

FIG. 2B  1.6 x SCALING USING PIXEL REPLICATION

FIG. 2A  SOURCE DATA

PAT01

PAT02

PAT03

PAT04

PAT05

PAT06

PAT07

PAT08

PAT09

PAT10

PAT11

PAT12

FIG. 10A

PAT13   PAT14   PAT15   PAT16

PAT17   PAT18   PAT19   PAT20

PAT21   PAT22   PAT23   PAT24

SCALING METHOD AND APPARATUS FOR A FLAT PANEL DISPLAY

FIELD OF THE INVENTION

The invention relates generally to a method and apparatus for the scaling of digital image data. In particular, the invention relates to a method of enhancing image quality in images reproduced in a display format that differs from the original image format.

BACKGROUND OF THE INVENTION

Digital video images such as those seen on computer display monitors are typically formatted according to industry standards (e.g., VGA, SVGA and XGA). Each standard defines various resolutions. Commonly, many different resolutions are supported by computer displays, however, flat panel displays and fixed resolution cathode ray tubes (CRTs) generally do not support multiple resolutions.

Digital image data can be scaled to make it compliant with the requirements of different standards. For example, VGA (640×480) data is scaled by a factor of 1.6 to fill a fixed XGA (1024×768) display. In some cases the source image resolution is higher than the monitor and must be scaled down. Some display devices are not capable of scaling images and thus only use a portion of the display area or a subset of the source image data.

A basic scaling technique is pixel replication which exhibits dramatic artifacts for fractional scale factors. Other traditional scaling algorithms do not provide maximum quality for fixed resolution monitors. The resulting images often appear out of focus or reveal jagged edges.

SUMMARY OF THE INVENTION

The present invention features a method and apparatus for scaling and enhancing a digital image has been developed which is useful in a wide variety of applications including, but not limited to, adapting digital image data for various video formats. The method and apparatus can be used to enhance the display of digital image data by smoothing the jagged edges inherent in digital images.

In one aspect, the invention features a method for enhancing a digital image. The method includes the steps of receiving a digital source image; selecting, for each output pixel, a block of source pixels having a center pixel which overlaps the output pixel; detecting edges in the block to generate an edge array; and processing the edge array to generate an effective source location for the output pixel. In one embodiment of the method, the step of processing the edge array includes applying a set of logic operations to detect a feature. In another embodiment, the method further includes the step of calculating an output value based on the value of at least one source pixel within the block. The step of calculating an output pixel value can include interpolating the output pixel value based on the values of four adjacent pixels within the block. In another embodiment, the method includes the additional step of modifying the effective source location to generate a modified effective source location based on a predetermined modifier function.

In another embodiment, the method includes the steps of receiving a digital source image; determining a source location for each output pixel; modifying the source location based on a predetermined modifier function to generate a modified source location; and interpolating an output pixel value based on the source pixel values of a block of four adjacent pixels relative to the modified source location.

In another aspect, the invention features an apparatus for enhancing a digital image. The apparatus includes an image buffer for receiving and storing source pixels. An edge detector module is coupled to the image buffer and receives, for each output pixel, a block of source pixels which has a center pixel that overlaps the output pixel. The edge detector generates arrays of horizontal and vertical edge values from the block. A memory buffer is coupled to the edge detector module and stores the array values. A processor is coupled to the memory buffer and generates an effective source location for each output pixel using the array values. In one embodiment, the processor also modifies the effective source location based on a predetermined modifier function. In another embodiment, the apparatus also includes a flat panel display coupled to the processor for graphically displaying the output pixel value.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION OF THE INVENTION

Figure 1A:
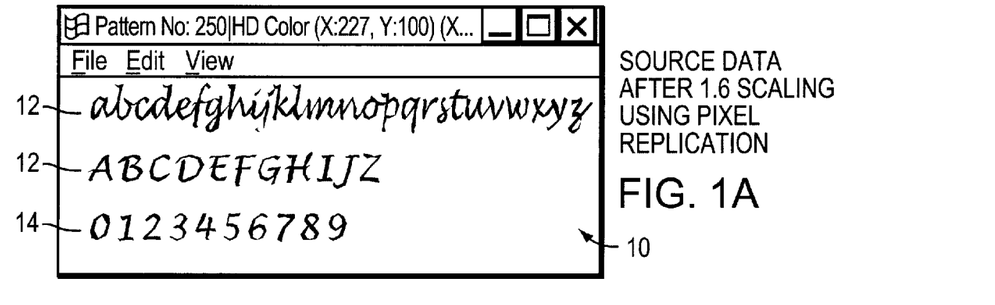
FIGS. 1A to 1C illustrate scaled source data using pixel replication, using bilinear interpolation, and using a combination of bilinear interpolation and an edge detection logic, respectively.

FIG. 1A shows script characters 12 and numerals 14 displayed as an image 10 on an XGA video monitor. The characters 12 and numerals 14 are generated from bitonal pixel values (i.e., only two possible pixel values). The source data corresponding to the characters 12 and numerals 14 were generated for display on a VGA monitor. The source data have been scaled by a factor of 1.6 to allow the characters 12 and numerals 14 to be displayed on the higher resolution XGA monitor. The smooth edges of the script characters 12 are not apparent, instead the discrete nature of the digital image can be seen as jagged edges that detract from the overall image quality.

Figure 1B:
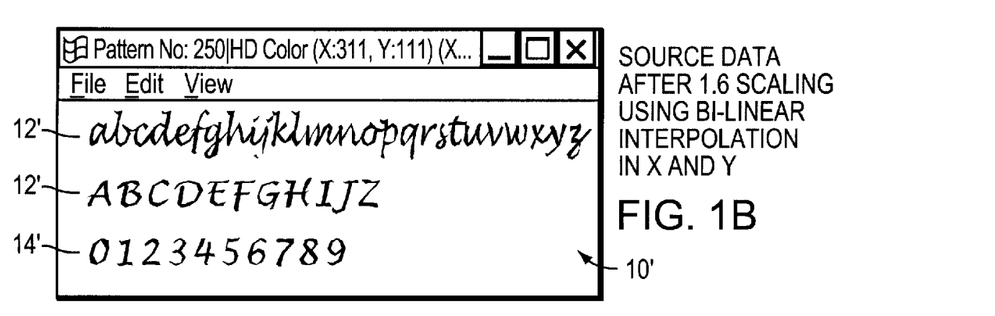

In FIG. 1B the source data used to generate the characters 12' and numerals 14' of scaled image 10' have been scaled by a value of approximately 1.6 and processed using a bilinear interpolation applied along the horizontal and vertical axes of the display. Although still observable, the jagged edges are less apparent. The result is an improved image quality.

Figure 1C:
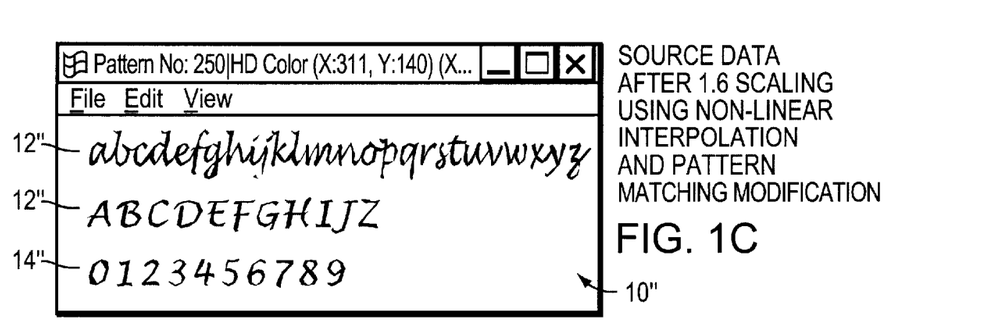

FIG. 1C shows an enhanced image 10" which includes enhanced script characters 12" and numerals 14" after processing the source data of FIG. 1B and applying the enhancement technique of the present invention. The result is an image 10" where the discrete pixel appearance inherent in many digital images is substantially reduced.

Figure 2A:
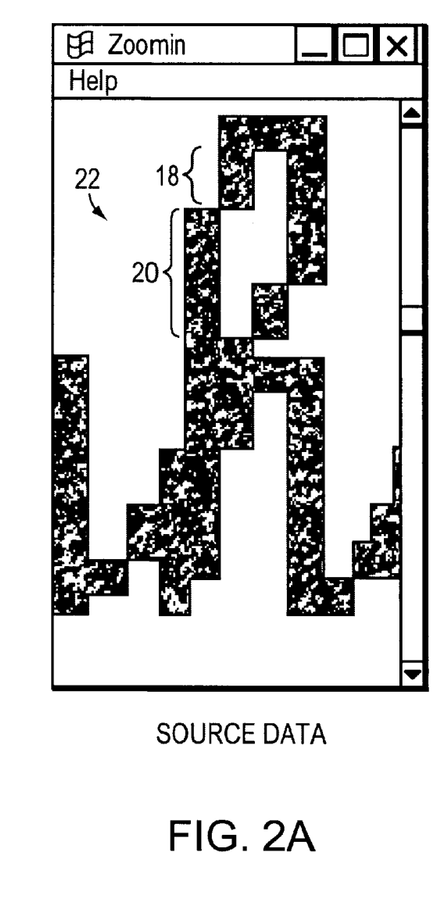
FIGS. 2A to 2C illustrate source data, scaled source data using pixel replication, and scaled source data using a combination of bilinear interpolation and edge detection logic, respectively.
Figure 2B:
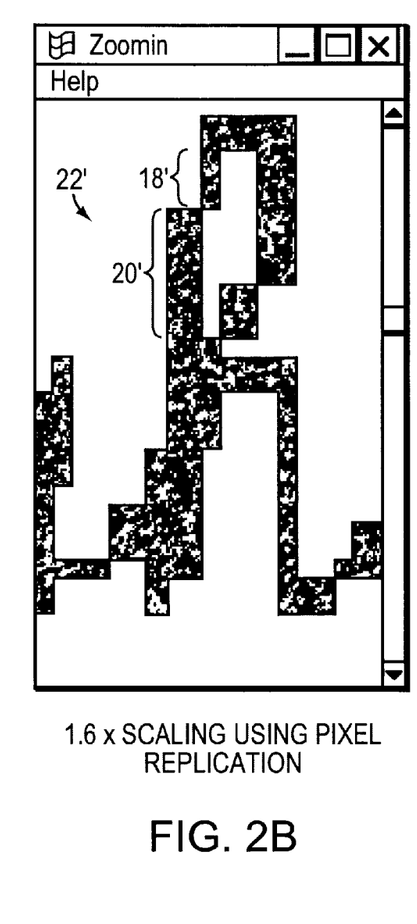

FIG. 2A illustrates a portion of a flat panel display with a partial image 22 comprised of pixels at one of only two values (i.e., pixel on or pixel off). FIG. 2B illustrates a partial image 22' displayed on the flat panel display having a vertical and horizontal resolution 1.6 times that of the monitor in FIG. 2A. The partial image 22' includes features which are of different widths than the corresponding features in the partial image 22 of FIG. 2A. For example, vertical line segment 18' which is only one pixel wide is narrower than the corresponding one pixel wide line segment 18 in the unscaled partial image 22. Vertical line segment 20', however, is two pixels wide and thus is slightly wider than the corresponding line segment 20 in the unscaled image 22.

Figure 2C:
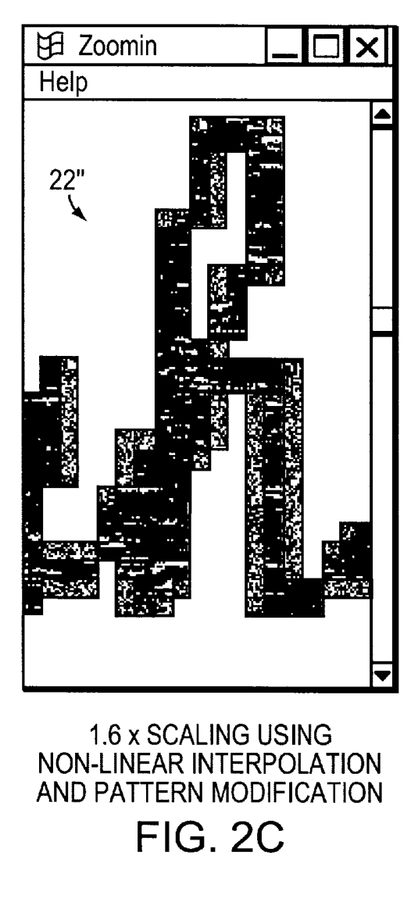

FIG. 2C shows an enhanced partial image 22" on the flat panel display of FIG. 2B resulting from application of the method of the present invention. The enhanced image 22" is, in part, the result of applying a non-linear interpolation technique to the data displayed in FIG. 2B. The data used to generate the enhanced image 22" was also processed with an edge detection logic algorithm to determine the location of edges (i.e., sharp changes in pixel values between adjacent pixels). A comparison of the edge locations with predetermined edge arrangements (i.e., edge arrays) corresponding to known features is performed. If the comparison determines that a feature is likely contained in the data, then pixel values in the neighborhood of the feature can be adjusted. The final result is an enhanced image 22" with a smoothing of the jagged artifacts inherent in the display of binary data. In general, the enhanced image 22" is more acceptable to the viewer than an unenhanced image 22 or 22' because the features more closely resemble the original image (beforescaling).

Figure 3:
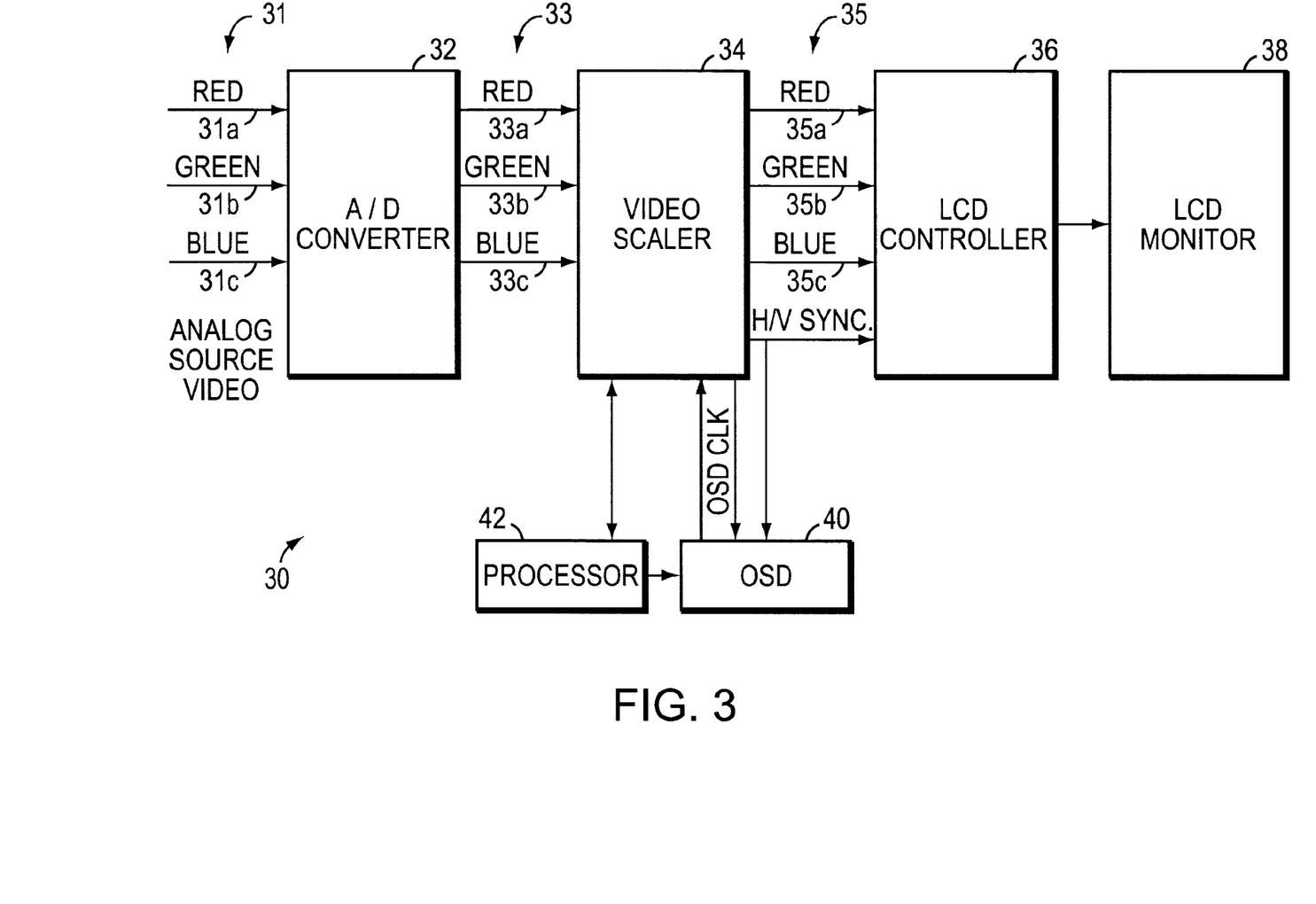
FIG. 3 is a block diagram of a system for scaling red, green and blue (RGB) video data for display on an LCD panel.

FIG. 3 shows a block diagram of a system 30 for enhancing and scaling RGB video data for compatibility with different video formats. The system 30 includes an analog-to-digital (A/D) converter 32 for receiving RGB analog source video 31*a*–*c* and converting it to RGB digital data 33*a*–*c*, respectively. After conversion to digital format, each pixel in the digital data 33*a*–*c* is represented by separate 8-bit components for red, green and blue. A video scaler module 34 receives the RGB digital data 33*a*–*c* and processes it to generate scaled pixel data 35*a*–*c*. A liquid crystal display (LCD) controller 36 receives the scaled pixel data 35*a*–*c* and drives a LCD monitor 38 displaying the enhanced image 22". An on-screen display (OSD) module 40 is used to input character data to the video scaler module 34 where it is merged into the scaled pixel data 35*a*–*c*. A processor 42 coordinates the operations of the video scaler module 34 and OSD module 40.

Figure 4:
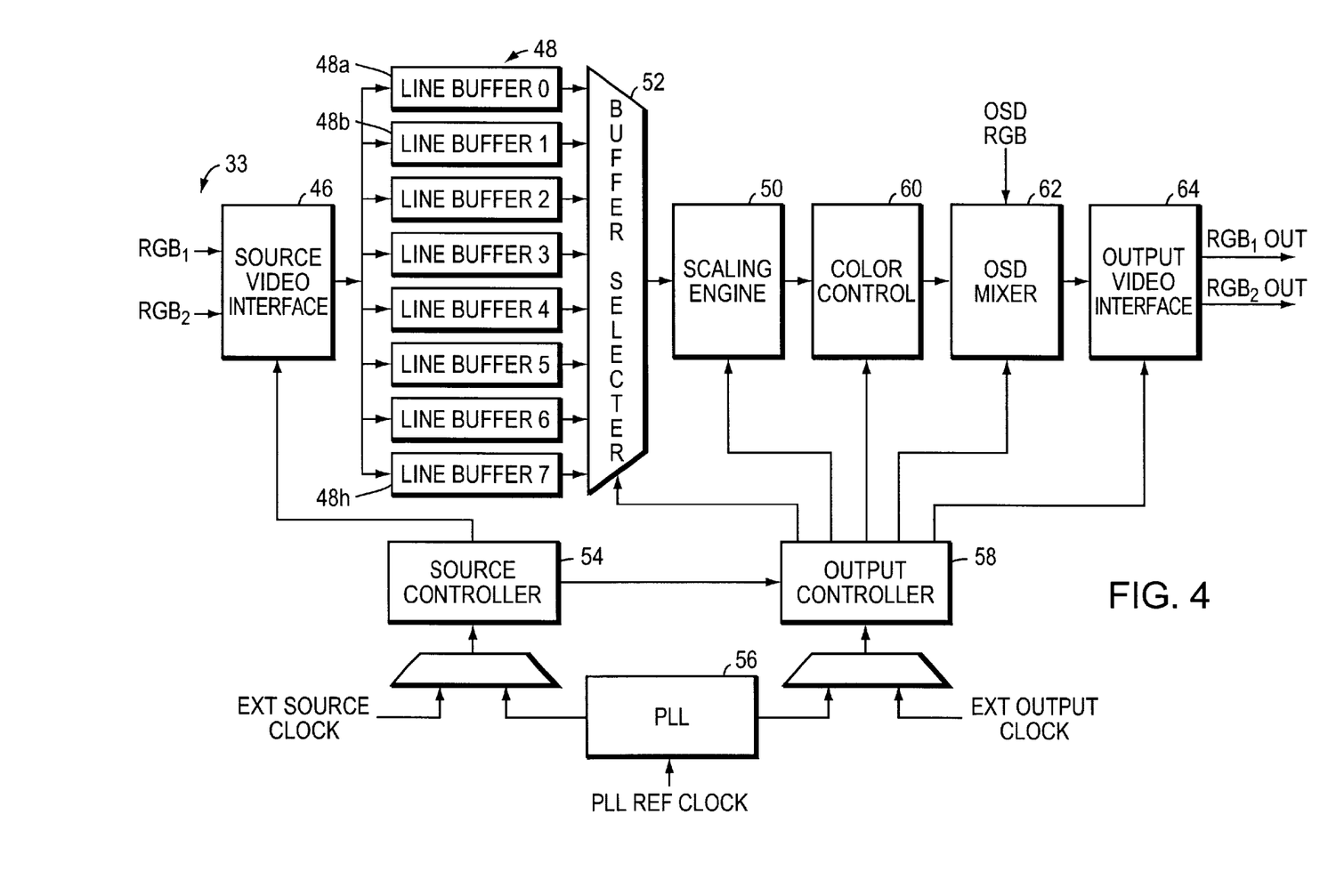
FIG. 4 is a block diagram of a video scaling module according to the invention.

FIG. 4 illustrates the components of the video scaler module 34 and processor 42. A source video interface module 46 receives input source pixels 33 (RGB digital data) from one or more A/D converters 32 or digital sources (FIG. 3) and distributes the pixels in pairs to the eight line buffers 48*a*–*h*. Each of the line buffers 48*a*–*h* is sized to support the scaleable source video mode with the greatest horizontal resolution. For example, if the largest scaleable video mode is 832×624 SVGA, then each line buffer 48 can hold 832 pixels and is structured as 416 words of 48 bits each (two pixels wide). Only the source video interface module 46 can write to the line buffers 48 and only active pixels can be stored. Scaling engine 50 receives data from selected line buffers 48 as determined by buffer selector 52. An individual buffer 48 can never be accessed simultaneously by both the source video interface module 46 and the scaling engine 50.

When the number of active source pixels does not exceed 832, each line of source video is stored into a single line buffer 48 beginning at location zero. The first source line of the vertical frame is always stored in line buffer zero 48*a*. Subsequent source lines are stored in sequentially numbered line buffers 48, wrapping around to line buffer zero 48*a* after filling the seventh line buffer 48*h*. The scaling engine 50 accesses five consecutive line buffers 48 at a time. When a subsequent output line requires a new source line, the five consecutive line buffers 48 beginning at the next sequentially numbered line buffer 48 are accessed, wrapping around to line buffer zero 48*a* after the seventh line buffer 48*h* is accessed. For example, the sequence of line buffers 48 accessed is (0-4), (1-5), (2-6), (3-7), (4-7, 0), etc.

When the number of active source pixels exceeds 832, each line of source video is stored in two consecutive line buffers 48. For example, XGA video mode requires 1024 horizontal pixels. In this case, the first 512 pixels of the source line are stored in line buffer zero 48*a* beginning at location zero. The remaining pixels of the source line are stored in line buffer one 48*b*. The first source line of the vertical frame is always stored in line buffers zero and one, 48*a* and 48*b*, respectively. Subsequent source lines are stored in sequentially numbered pairs of line buffers 48, wrapping around to line buffer zero 48*a* after filling the seventh line buffer 48*h*. The scaling engine 50 only accesses one line buffer 48 at a time because enhancement must be disabled when the number of pixels in a source video line exceeds the size of a line buffer 48. The first output line of the vertical frame is read from line buffers zero and one, 48*a* and 48*b*, respectively. Each subsequent output line is accessed from the next pair of sequentially numbered line buffers 48, wrapping around to line buffer zero 48*a* after the seventh line buffer 48*h* has been read. For example, the sequence of line buffers 48 accessed is (0-1), (2-3), (4-5), (6-7), (1-2), etc.

A source controller 54 generates all control and timing signals related to the source pixel stream based on the source pixel clock from a phase lock loop (PLL) reference module 56 or an external source clock. In particular, the source controller 54 controls operation of the source video interface module 46 and writing to the line buffers 48. The source controller 54 communicates with an output controller 58 which is used to correctly align the source and output vertical frames. The output controller 58 controls timing for the output pixel stream based on the output pixel clock from the PLL reference module 56 or an external output clock. In particular, the output controller 58 controls the scaling engine 50, a color control module 60, an OSD mixer 62, and an output video interface module 64.

Figure 8A:
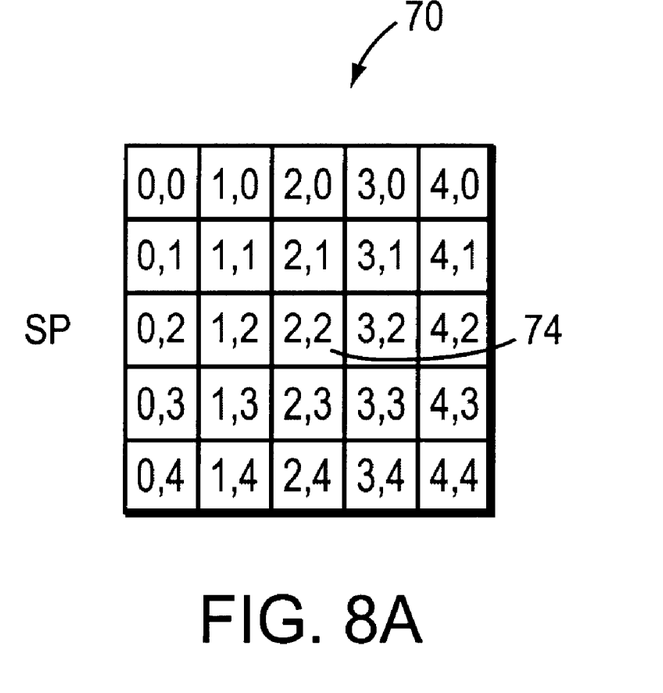
FIGS. 8A and 8B illustrate the source pixel window and the four interpolation pixels, respectively, used to generate an output pixel value.

Referring to FIG. 8A, the scaling engine 50 maintains a 5×5 block 70 (i.e., array) of source pixels SP[0,0] through SP[4,4] which are used to calculate the value of an output pixel. When enhancement is enabled, all 25 pixels in the window 70 are used in determining the output pixel value. When enhancement is disabled, the value of the center pixel 74 (i.e., SP[2,2]) is used as the value of the output pixel. The output controller 58 provides data to the block 70 one column at a time as it is read from the line buffers 48. When enhancement is enabled, the values for each vertical column are obtained by accessing one pixel from each of five consecutive line buffers 48, one at a time. When enhancement is disabled, only the center row of pixels SP[1 . . . 5,2] is actually accessed from the line buffers 48.

Figures 5A, 5B, 5C, 6:
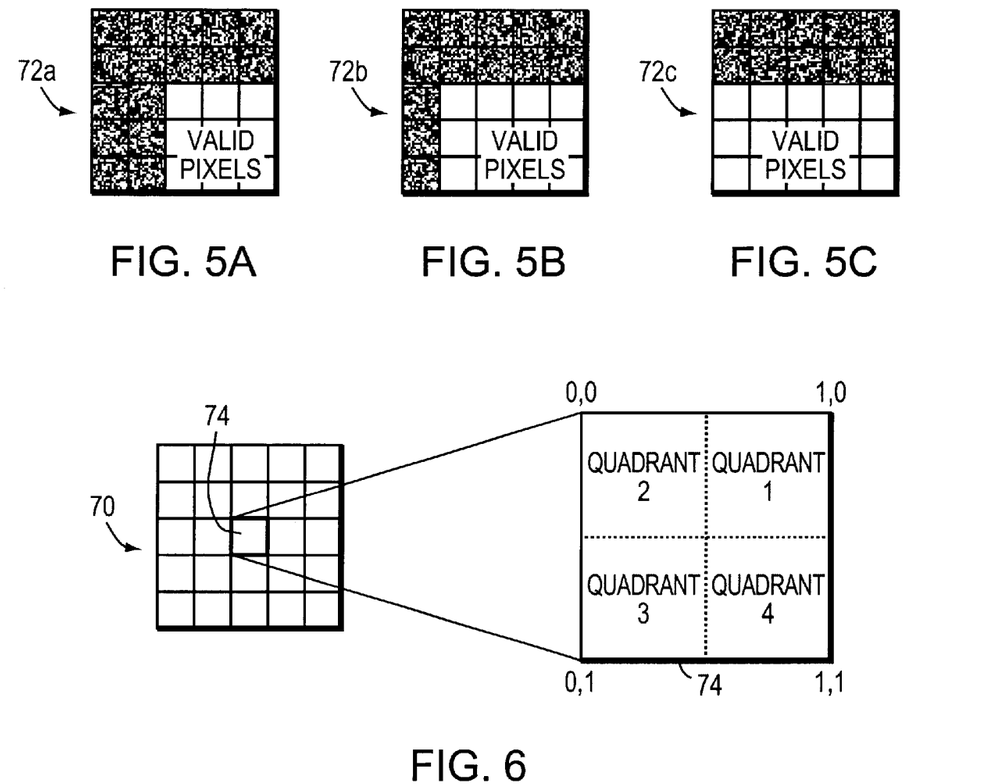
FIGS. 5A through 5C are pixel valid masks for determining valid source pixels for calculating output pixel values.
FIG. 6 illustrates the relationship of a center source pixel with respect to a source pixel window.

A set of five-bit row×five-bit column pixel valid masks 72 are used by the scaling engine 50 to determine which rows and columns of the block 70 are valid (see FIG. 5A). The pixel valid masks 72 are used to identify the edges and corners of the screen. For example, for the first output pixel of a vertical frame (top left pixel), the top two rows and the leftmost two columns of the window are invalid. FIGS. 5A to 5C illustrate the pixel invalid masks corresponding to the first three pixels of the top line of the source video frame, respectively. If any of the pixels in the pixel valid mask 72 are not valid, then the scaling engine 50 generates an output pixel value equal to the value of the center source pixel 74.

For each output pixel, the scaling engine 50 also receives the position of the output pixel relative to the center source pixel 74. Referring to FIG. 6, the center of the output pixel must always lie within the boundaries of the center pixel 74. The center pixel 74 has dimensions of (1, 1) and the coordinate system uses unsigned values with the center of the center source pixel 74 at (0.5, 0.5). The four quadrants of the center pixel 74 are also defined for use in calculating the output pixel value.

The source pixel which bounds the output pixel is determined by dividing each coordinate of the output pixel by the scale factor appropriate for the video format conversion and rounding the result to the nearest integer. The horizontal scale factor is the ratio of the width of the source video in pixels to the width of the output video in pixels. Similarly, the vertical scale factor is the ratio of the height of the source video in pixels to the height of the output video in pixels. As an example, consider which source pixel to use at the center pixel 74 of the block 70 for output pixel (29,57). Assuming the source video is VGA mode (640×480 resolution) and the output video is XGA mode (1024×768 resolution), the horizontal scale factor, $SF_H$, and vertical scale factor, $SF_V$, are $$SF_H = \frac{1024}{640} = 1.6$$

$$SF_V = \frac{768}{480} = 1.6$$

Thus, the center pixel 74 is source pixel (18, 36).

Figure 7A:
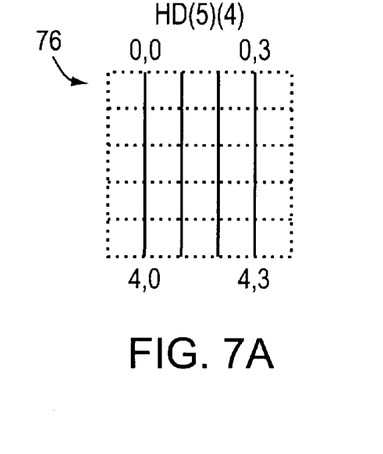
FIGS. 7A and 7B illustrate possible vertical and horizontal edges, respectively, in a source pixel window.
Figure 7B:
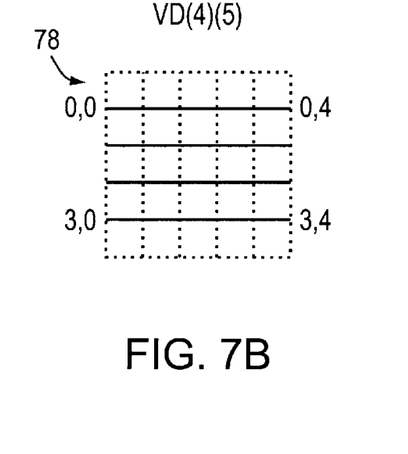

The method used by the scaling engine 50 to determine the output pixel value is based on several steps. First, the pixel values of the block 70 are processed to generate horizontally and vertically detected edges between adjacent pixels. Referring to FIGS. 7A and 7B, there are a total of 40 possible edges in each block 70. The horizontally detected edges are stored in a 4×5 horizontal edge array 76 and the vertically detected edges are stored in a 5×4 vertical edge array 78. For each possible edge, a difference flag is defined and set if its corresponding edge exists. An edge exists between two adjacent pixels when the absolute difference between any of their color components exceeds a programmable edge threshold value.

Figure 10A:
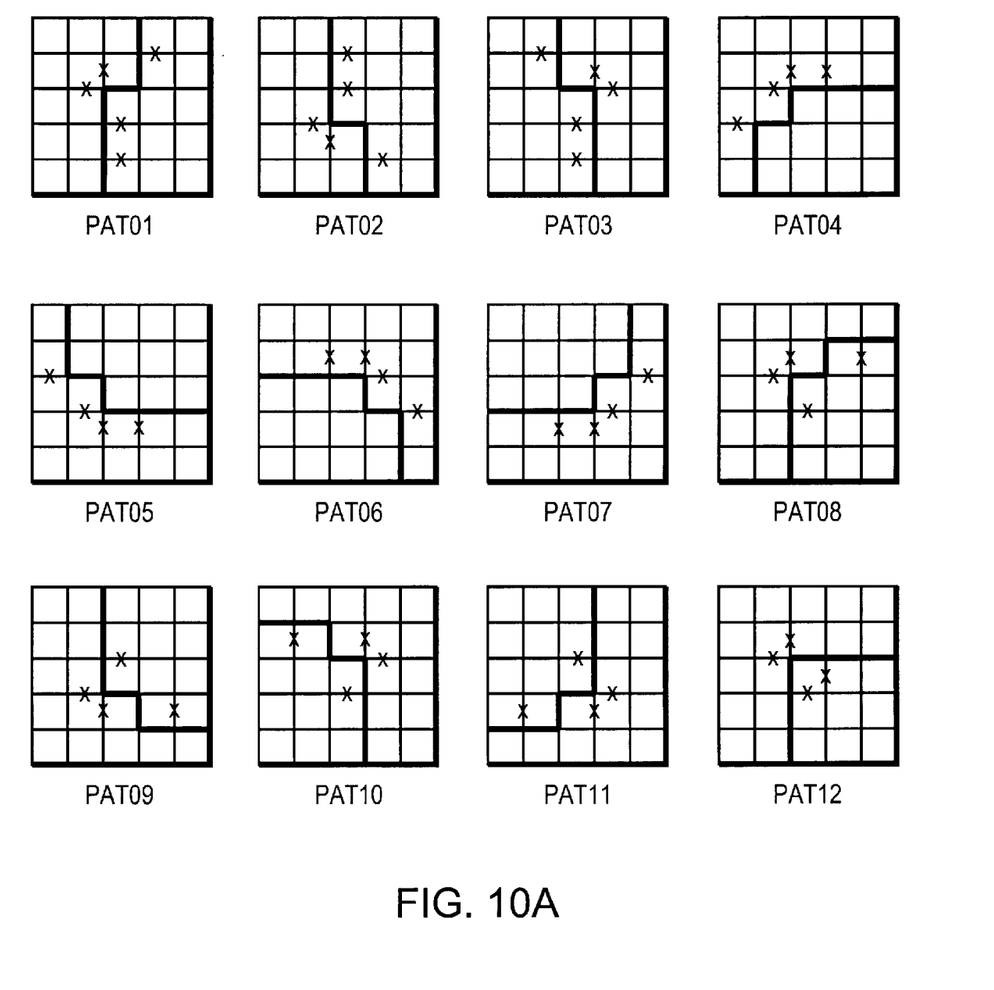
FIGS. 10A and 10B illustrate edge detection logic arrays used for identifying specific edge arrangements in source pixel array data.
Figure 10B:
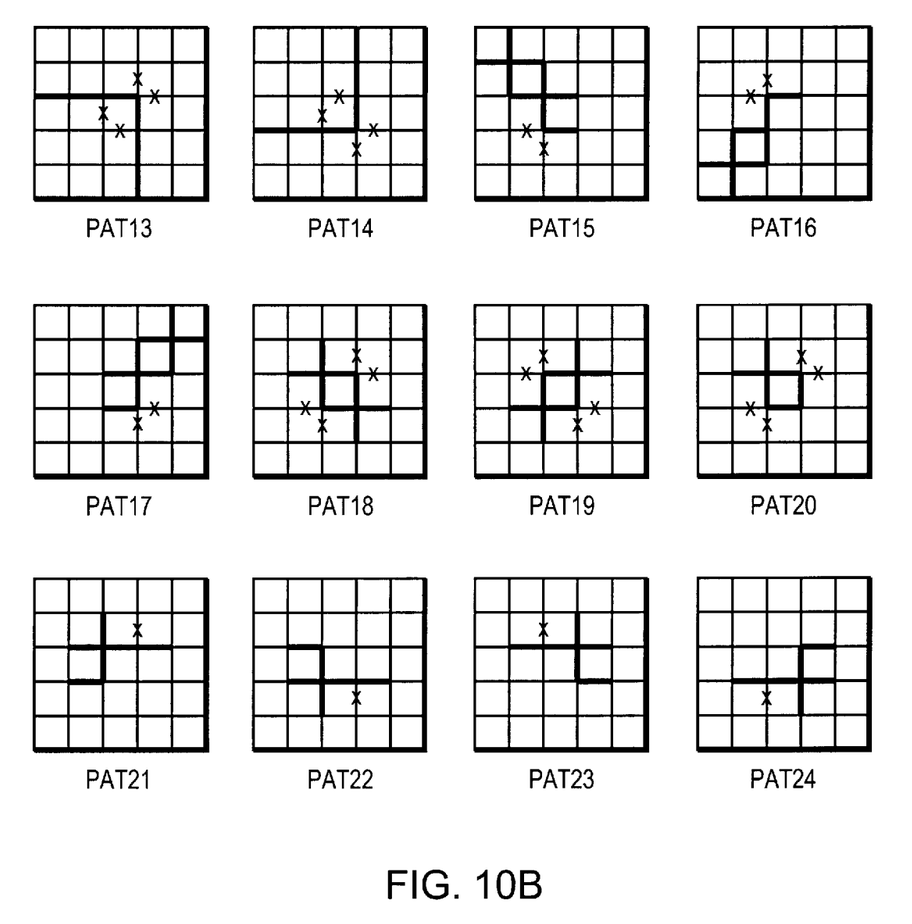

The next step for determining the output pixel value is to process the horizontal and vertical edge arrays 76 and 78 with a set of predetermined logic arrays 84 shown as Pat01 to Pat24 FIGS. 10A and 10B. Each logic array 84 consists of 40 logic operations corresponding to the 40 edge flags. Each logic operation generates a decision variable which can have one of three possible logical values (true, false or don't care). The decision variables for each logic array 84 are represented as follows:

| or_    edge must be present for a match x    all edges must be absent for a match No |, _or x    presence or absence of edge is not relevant (don't care)

The logical values are determined according to the truth table shown in Table 1.

TABLE 1

Edge Match Truth Table

| Decision Variable | Edge Flag | Match |
| --- | --- | --- |
| True | True | True |
|  | False | False |
| False | True | False |
|  | False | True |
| Don't-care | True | True |
|  | False |  |

A logic array 84 is considered to match with a set of edge arrays 76 and 78 when all of its decision variables have true or don't-care logical values. If a match is found, a match variable is set equal to a value which uniquely describes the matched logic array (i.e., an index value). If more than one match exists, the match variable is set based on the first matched logic array. The match variable is set to zero when no match exists.

Figure 8B:
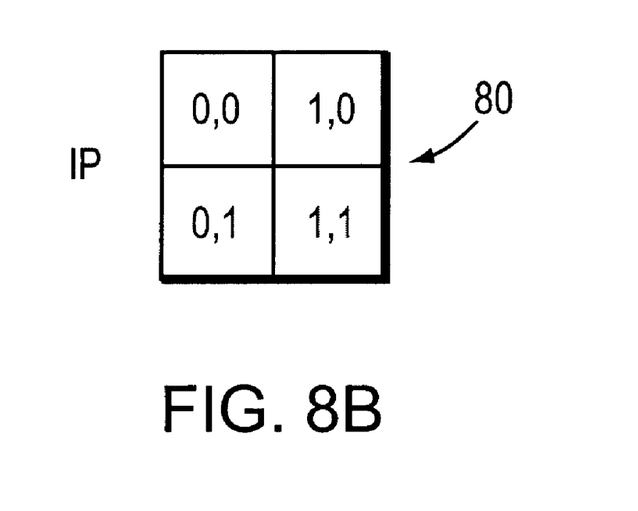

Referring to FIGS. 8A and 8B, the value of the output pixel is calculated from a 2 by 2 source pixel array 80, which is selected from the block 70 according to the quadrant of the center source pixel 74 which borders the output pixel. The four source pixels 80 selected include the center pixel 74 and the three source pixels which are the closest to the output pixel center. For example, if the output pixel is centered in the third quadrant (see FIG. 6) of the center source pixel 74 then the selected pixels are SP[1,2], SP[2,2], SP[1,3] and SP[2,3].

Figure 9:
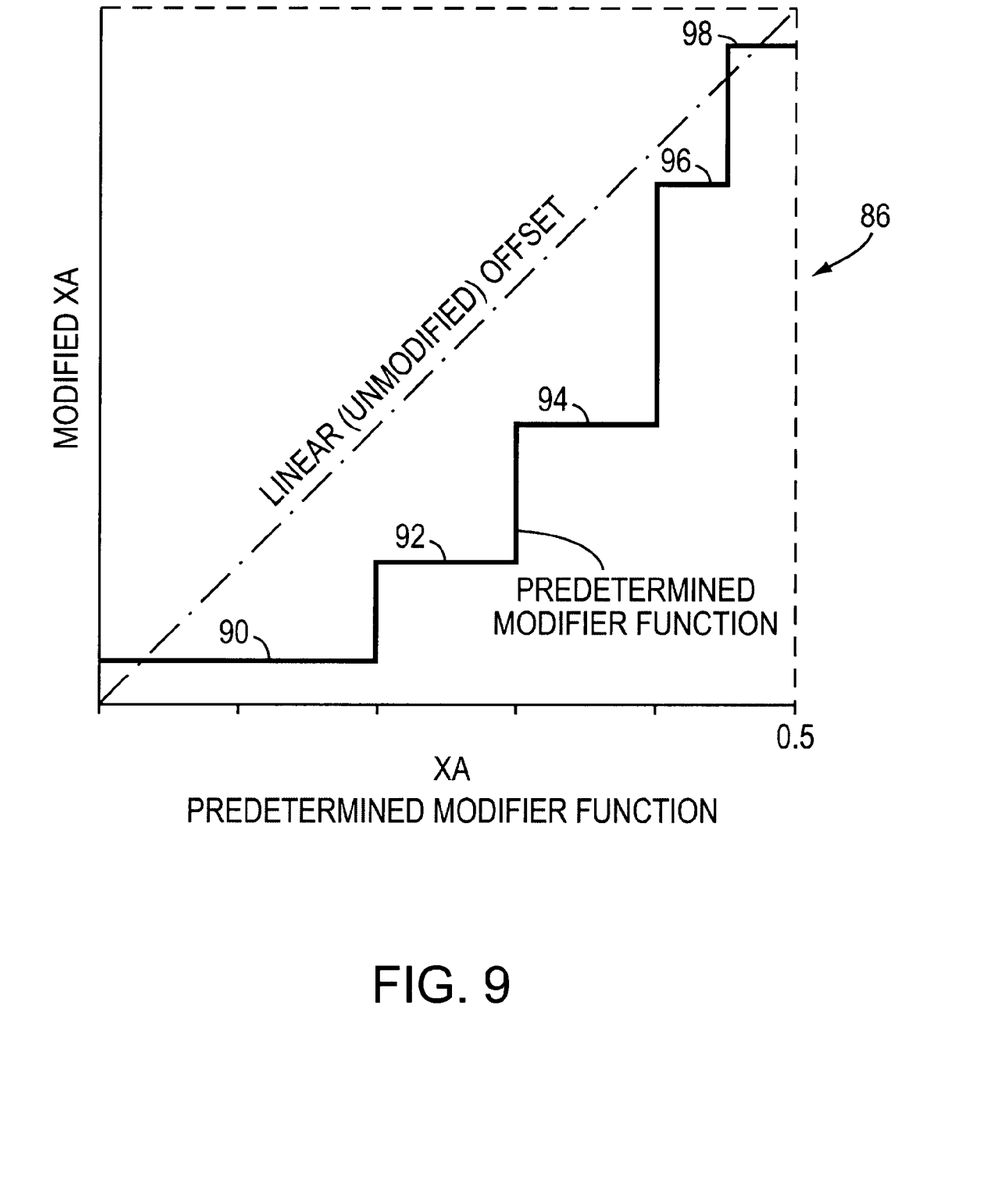
FIG. 9 is a plot of a step function offset adjustment used in generating a modified effective source location of an output pixel.

In another step performed by the scaling engine 50, the offset (XA, YA) of the output pixel relative to the center of the center source pixel 74 is determined. XA and YA can be conditionally adjusted if a logic array 84 is matched. Each logic array 84 defines a condition which is a function of the quadrant of the center source pixel 74 in which the output pixel center is located. If the condition is true, then the values of (XA, YA) are adjusted, effectively changing the location of the center source pixel 74 with respect to the block 70. Each offset or adjusted offset value is then modified according to a predetermined modifier function 86 as shown in FIG. 9. The predetermined modifier function 86 is defined in steps 90, 92, 94, 96 and 98 by assigning a unique offset value for each of a range of offset values. The function 86 is programmable to adapt to the requirements of a particular display application.

In another step, two 1×2 arrays (not shown) of interpolation constants, XC and YC, are defined. The quadrant of the center source pixel 74 in which the output pixel center is located based on the adjusted offset is used to determine XC and YC as follows:

Quadrant 1
    XC[0]=1−XA
    XC[1]=XA
    YC[0]=YA
    YC[1]=1−YA Quadrant 2
    XC[0]=1−XA
    XC[1]=1−XA
    YC[0]=YA
    YC[1]=1−YA Quadrant 3
    XC[0]=1−XA
    XC[1]=1−XA
    YC[0]=1−YA
    YC[1]=YA Quadrant 4
    XC[0]=1−XA
    XC[1]=XA
    YC[0]=1−YA
    YC[1]=YA If enhancement is disabled or if any of the source pixels in the block 70 are invalid due to intersection with the edges of the source bitmap, then the output pixel value is assigned the same value as the center source pixel 74. Otherwise, the output pixel value C is obtained by bilinear interpolation of the four pixels in IP as follows:

$$C1=(IP[0,0].C*XC[0])+(IP[1,0].C*XC[1])$$

$$C2=(IP[0,1].C*XC[0])+(IP[1,1].C*XC[1])$$

$$C=(C1*YC[0])+(C2*YC[1])$$

where IP[0,0].C, IP[1,0].C, IP[0,1].C and IP[1,1].C are the value for one color (e.g., red, green or blue) of the four interpolation pixels shown in FIG. 8B. This bilinear interpolation is used to generate all color values for each output pixel.

Figure 11A:
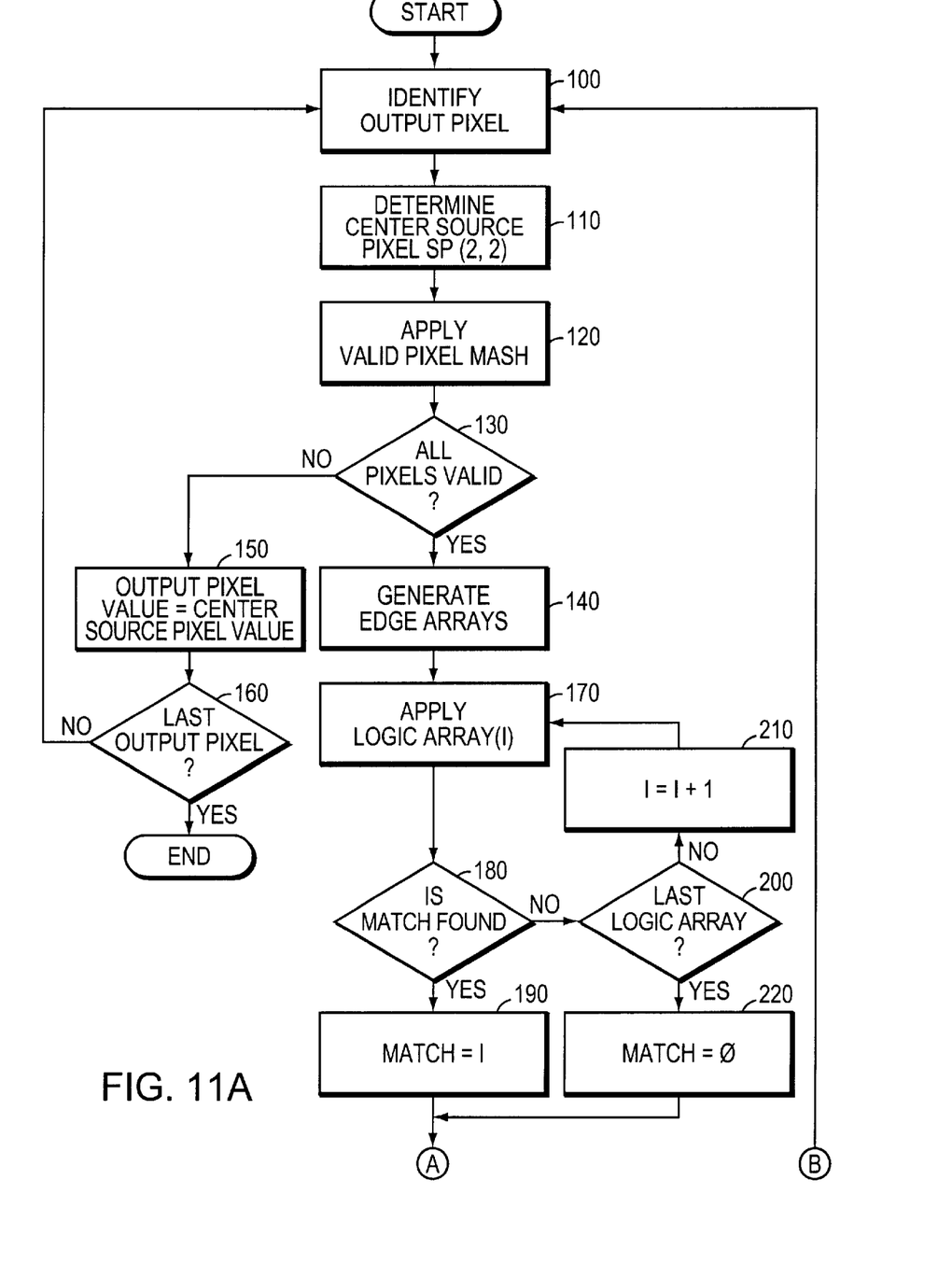
FIGS. 11A and 11B are a flowchart of an iterative method of scaling digital image data according to the invention.
Figure 11B:
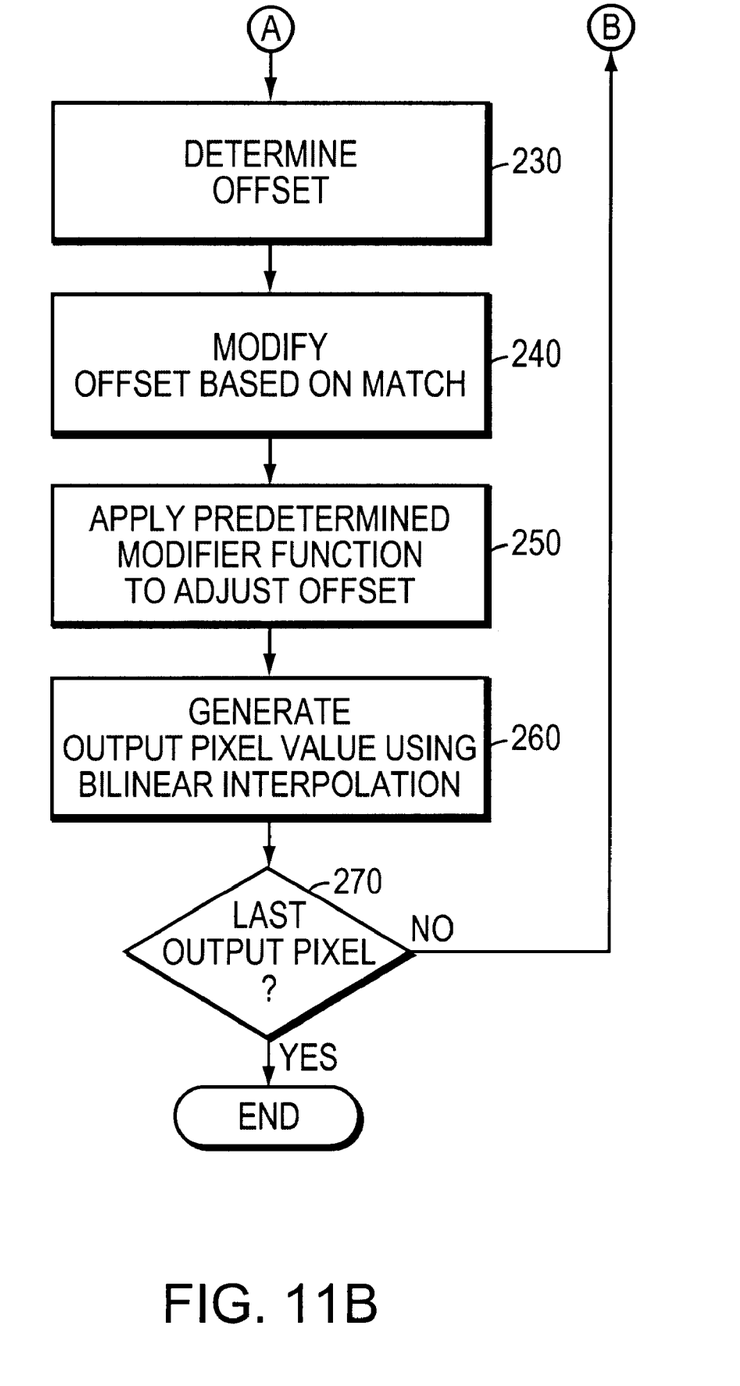

Referring to the flowchart in FIG. 11, one implementation of the method of the invention is described as a series of steps. At step 100, the next output pixel to be generated for the scaled display is determined. At step 110, the corresponding center source pixel 74 is determined by dividing the coordinates of the output pixel by the corresponding horizontal and vertical scale factors, $SF_H$ and $SF_V$, respectively, and rounding the result to the nearest integer. A valid pixel mask 72 corresponding to the center source pixel 74 is applied in step 120 and a determination as to whether all pixels are valid is made in step 130. If all the pixels are valid then horizontal and vertical edge arrays are generated in step 140. If not all the pixels are valid, however, the output pixel value is assigned the value of the center source pixel in step 150, whether any more output pixel values are to be determined is decided in step 160 and the method returns to step 100, if necessary.

After step 140 is completed, the first of the set of logic arrays 84 is applied to the edge arrays 76 and 78 in step 170. If a match is determined in step 180, then a match variable is set to indicate the matched array in step 190. If no match results from step 180 and if there is at least one more logic array 84 to be applied as determined in step 200, then the next logic array 84 is applied (steps 210 and 170). If no match results from step 180 and there are no more logic arrays 84 to be applied, then the match variable is set to zero in step 220.

At step 230, the absolute offset values of the output pixel relative to the center of the center source pixel 74 are determined. The offsets are modified in step 240 based on the match variable value. A predetermined modifier function 86 is used to adjust the offset values in step 250. The output value of the pixel is determined by bilinear interpolation in step 260 using the offset values generated in the previous step. If any more output pixel values must be determined according to step 270, another iteration is started by returning to step 100.

Equivalents

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method for enhancing a digital image comprising the steps of:
    a) receiving a digital source image comprised of a plurality of source pixels;
    b) selecting, for each output pixel, a block of source pixels having a center pixel which overlaps the output pixel;
    c) detecting edges in the block of source pixels to generate one of a horizontal edge array and a vertical edge array; and
    d) processing the one of a horizontal edge array and a vertical edge array to generate an effective source location for the output pixel.

2. The method of claim 1 further comprising the step of calculating an output value based on the value of at least one source pixel within the block of source pixels.

3. The method of claim 1 wherein step d) comprises the steps of processing the one of a horizontal edge array and a vertical edge array with a set of logic operations to detect a feature and generating the effective source location for the output pixel based on the feature.

4. The method of claim 3 wherein the logic operations are performed according to a predetermined priority.

5. The method of claim 1 wherein step c) further comprises generating the other of a horizontal edge array and a vertical edge array.

6. The method of claim 2 wherein the step of calculating an output pixel value comprises interpolating an output pixel value based on the source pixel values of four adjacent pixels within the block of source pixels relative to the effective source location of the output pixel.

7. The method of claim 6 further comprising the step of graphically displaying the output pixel value.

8. The method of claim 1 further comprising the step of modifying the effective source location of the output pixel based on a predetermined modifier function to generate a modified effective source location of the output pixel.

9. The method of claim 8 further comprising the step of interpolating an output pixel value based on the source pixel values of four adjacent pixels within the block of source pixels relative to the effective source location of the output pixel.

10. The method of claim 1 wherein each source pixel has at least one source pixel value.

11. The method of claim 1 wherein step c) comprises detecting a difference in color values for each pair of adjacent pixels in the block of pixels.

12. The method of claim 11 wherein step c) further comprises comparing the difference in color values for each pair of adjacent pixels in the block of pixels with a threshold value.

13. The method of claim 1 wherein the output pixels have a different spatial resolution than the source pixels.

14. A method for enhancing a digital image comprising the steps of:
   a) receiving a digital source image comprised of a plurality of source pixels;
   b) determining, for each output pixel, a source location;
   c) modifying the source location of the output pixel based on a predetermined modifier function to generate a modified source location of the output pixel; and
   d) interpolating an output pixel value based on the source pixel values of a block of four adjacent pixels relative to the modified source location of the output pixel.

15. The method of claim 14 further comprising the step of graphically displaying the output pixel value.

16. The method of claim 14 wherein the output pixels have a different spatial resolution than the source pixels.

17. A method for enhancing a digital image comprising the steps of:
   a) receiving a digital source image comprised of a plurality of source pixels;
   b) selecting, for each output pixel, a block of source pixels having a center pixel which overlaps the output pixel;
   c) detecting horizontal and vertical edges in the block of source pixels to generate a horizontal edge array and vertical edge array, respectively;
   d) processing the horizontal edge array and vertical edge array to generate an effective source location for the output pixel;
   e) modifying the effective source location of the output pixel based on a predetermined modifier function to generate a modified effective source location of the output pixel; and
   f) interpolating an output pixel value based on the source pixel values of four adjacent pixels within the block of source pixels relative to the modified effective source location of the output pixel.

18. The method of claim 17 wherein the predetermined modifier function generates the effective source location based on predefined ranges of effective source locations.

19. The method of claim 17 further comprising the step of graphically displaying the output pixel value.

20. The method of claim 17 wherein the output pixels have a different spatial resolution than the source pixels.

21. An apparatus for enhancing a digital image comprising:
   a) an image buffer for receiving and storing at least a portion of source pixels formed from adjacent lines of a digital source image;
   b) an edge detector module electrically coupled to the image buffer for receiving, for each output pixel, a block of source pixels from the image buffer which has a center pixel that overlaps the output pixel and generating an array of horizontal edge values and an array of vertical edge values therefrom;
   c) a memory buffer electrically coupled to the edge detector module for storing the horizontal array of edge values and vertical array of edge values; and
   d) a processor electrically coupled to the memory buffer for generating an effective source location for each output pixel using the horizontal and vertical arrays of edge values.

22. The apparatus of claim 21 wherein the processor also interpolates an output pixel value in response to the source pixel values of the four closest pixels in the block of source pixel values based on the effective source location of the output pixel.

23. The apparatus of claim 22 further comprising an output device electrically coupled to the processor for graphically displaying the output pixel value.

24. The apparatus of claim 23 wherein the output device comprises a flat panel display.

25. The apparatus of claim 21 wherein the processor also modifies the effective source location of the output pixel based on a predetermined modifier finction to generate a modified effective source location of the output pixel.

26. The apparatus of claim 25 wherein the processor also interpolates an output pixel value based on the source pixel values of four adjacent pixels within the block of source pixel relative to the effective source location of the output pixel.

27. The apparatus of claim 26 further comprising an output device electrically coupled to the processor for graphically displaying the output pixel value.

28. The apparatus of claim 27 wherein the output device comprises a flat panel display.

29. The apparatus of claim 21 wherein the image buffer comprises a plurality of line buffers.

* * * * *